Dec. 24, 1963   D. M. RENNER   3,115,301
AUTOMATIC COUNTER MECHANISM
Filed Dec. 8, 1961   2 Sheets-Sheet 1
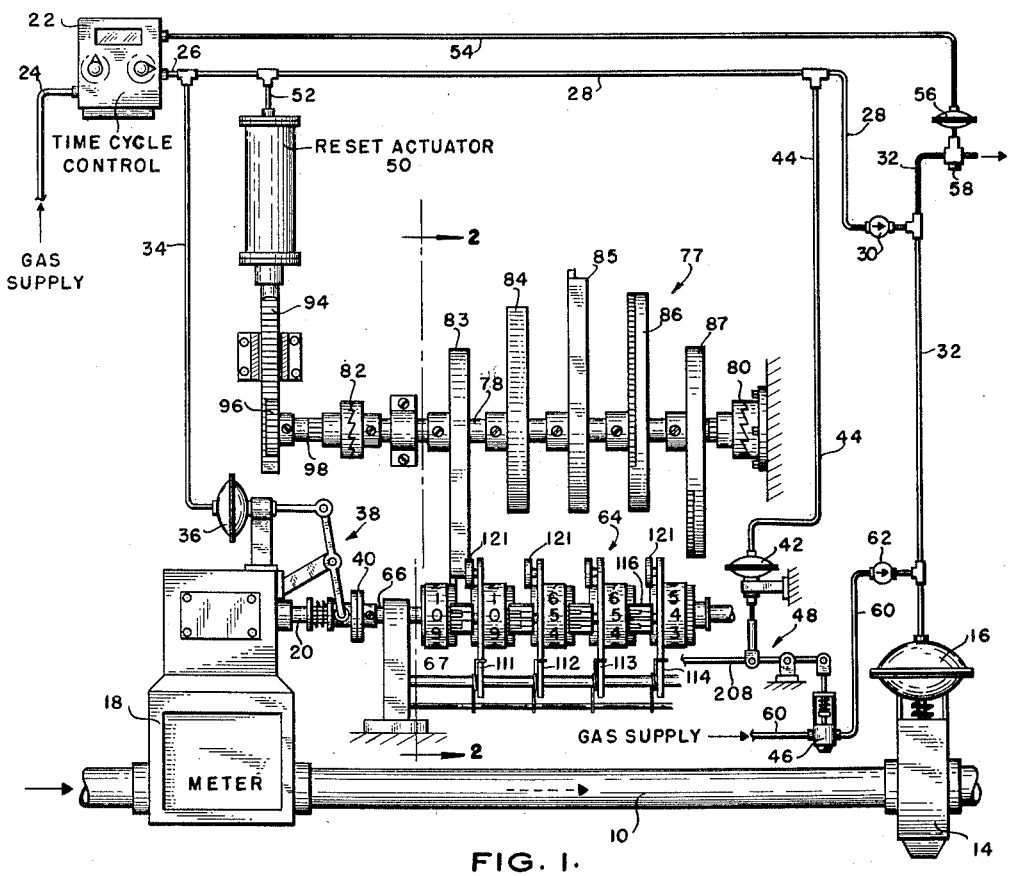
FIG. 1.
FIG. 5A.
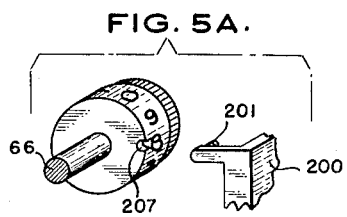
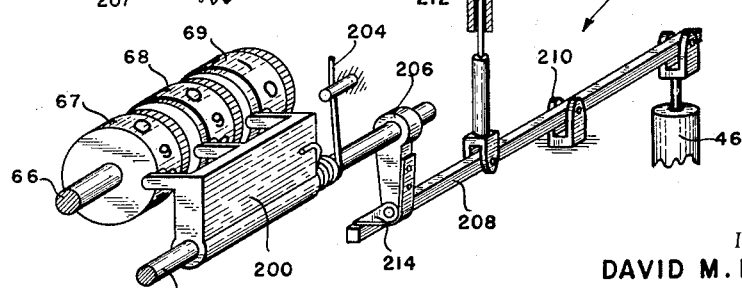
FIG. 5.
INVENTOR.
DAVID M. RENNER,
BY Frank S. Troidl
ATTORNEY.

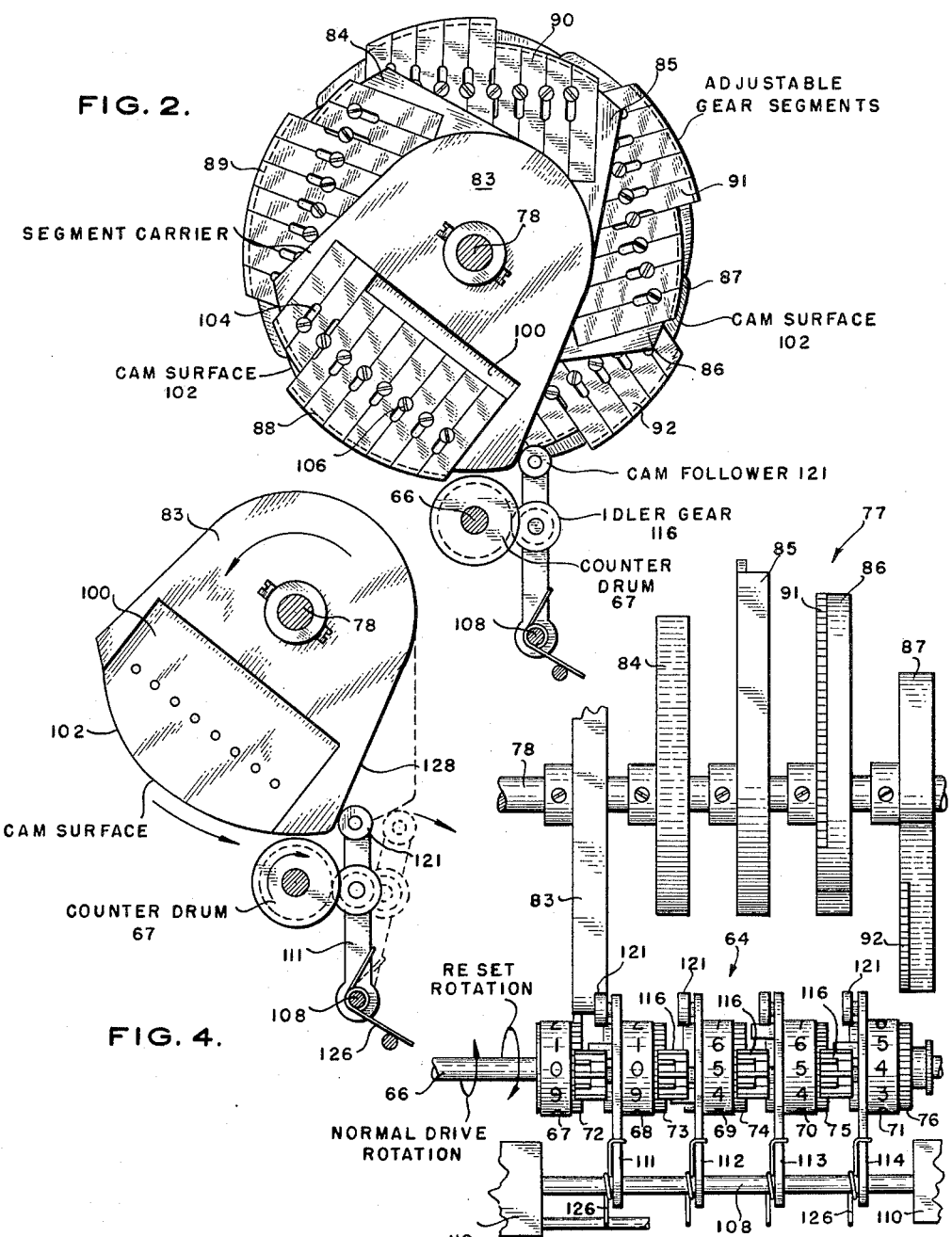

United States Patent Office 3,115,301
Patented Dec. 24, 1963

3,115,301
AUTOMATIC COUNTER MECHANISM
David M. Renner, Houston, Tex., assignor, by mesne assignments, to Jersey Production Research Company, Tulsa, Okla., a corporation of Delaware
Filed Dec. 8, 1961, Ser. No. 158,019
2 Claims. (Cl. 235—132)

This invention relates to counter mechanisms. More particularly, this invention is an improved counter mechanism which can be automatically operated to preset a predetermined number on the counter. This improved counter mechanism not only can be operated to preset a predetermined number on the counter, but also may be automatically operated to add a predetermined amount to a number already present on the counter drums of the counter.

The invention to be described herein has many and varied uses. For example, in automatic oil production operations it is sometimes required by state laws or otherwise required that only a predetermined volume of production be produced within a predetermined or specified time period. Thus, the system must be regulated according to time intervals as well as volume of production. If during a predetermined time period, say one day, the predetermined limit of production, say 100 barrels, through a particular pipeline is not produced, it is desirable to add the difference in the amount actually produced during the day and the desired 100 barrels to the 100-barrel production of the next succeeding day. My counter mechanism may be efficiently used in such automatic production operations.

Briefly described, my new counter mechanism includes a plurality of counter drums. These counter drums may be individually rotatable about a shaft. Each drum is provided with a gear having teeth. Means are provided for rotating the counter drums. The rotating means may include a cam mechanism having a plurality of sets of individually movable teeth. One set of teeth is provided for each counter drum. Each counter drum can be preset a predetermined amount by moving the desired number of teeth to a position to engage a particular gear on a particular counter drum, i.e., a drum is moved three units by moving three teeth to a position to engage the gear.

When the counter mechanism to be described herein is combined with other elements, a new system is provided for limiting the quantity of fluid flowed through a conduit during a predetermined time period. Briefly, this new system includes a flowmeter, a time controller, fluid flow control means and the counter mechanism. The time controller controls a cam mechanism actuating member. The time controller actuates the cam mechanism actuating member at the beginning of the time period, say at the beginning of a day's production of oil. The counter mechanism is thus preset and the flow of fluid through the conduit started. As the fluid flows through the conduit, means on the flowmeter responsive to the fluid flow move the counter mechanism back one unit for each unit of quantity of flow of fluid. When the counter mechanism has moved backward the predetermined preset number, means are actuated by the counter mechanism to stop the flow of fluid.

The invention as well as its many advantages may be further understood by reference to the following detailed description and drawings in which:

FIG. 1 is a schematic view showing the new system for limiting the quantity flowed through a pipeline;

FIG. 2 is an enlarged view taken along lines 2—2 of FIG. 1;

FIG. 3 is an enlarged view showing a portion of the cam mechanism of FIGS. 1 and 2;

FIG. 4 is a view showing one of the cams and its actuation;

FIG. 5 shows the mechanical interconnection between the counter drum mechanism and the recocking operator; and FIG. 5A is a view showing more clearly portions of the device of FIG. 5.

Referring to FIG. 1, a conduit or pipeline 10 is shown through which a metered amount of fluid is to be flowed. The control of the fluid flow is obtained by the use of a valve 14 controlled by diaphragm 16. The flowmeter 18 mounted in the conduit 10 measures the amount of fluid flowed through the flowmeter. A drive shaft 20 extends from the flowmeter 18.

The diaphragm-operated valve 14 is controlled by means of a dual time cycle controller or timing means 22. The timing means 22 is a pneumatically controlled timing means. Gas is supplied to the time cycle controller 22 through a line 24. A main gas outlet line 26 from timer 22 is connected to the diaphragm 16 of valve 14 through line 28, check valve 30, and line 32. Main gas line 26 is also connected through line 34 to a diaphragm 36 which actuates a mechanism indicated generally by the numeral 38. The mechanism 38 controls the position of the clutch 40. Main line 26 is also connected to a recocking diaphragm 42 through line 28 and line 44. Recocking diaphragm 42 controls the position of the valve 46 through the lever system indicated generally by the numeral 48. Main gas line 26 is also connected to a reset actuator 50 through lines 28 and 52.

A second main line 54 extends from the time cycle controller 22 to a diaphragm 56 controlling bleed valve 58 in line 32.

A gas supply line 60 controlled by valve 46 and check valve 62 also leads to the diaphragm chamber 16 of diaphragm valve 14. Hence, diaphragm valve 14 can be closed to shut off the flow of fluid through line 10 by application of pressure either through line 32 or through line 60.

The counter mechanism shown in FIGS. 1 and 3 and indicated generally by the numeral 64 includes a shaft 66 connected to the clutch 40. Rotatably mounted about the shaft 66 is a plurality of individually rotatable counter drums 67 through 71. Each drum is provided with a gear 72 through 76, respectively.

The counter drums 67 through 71 are individually rotated by means of a cam mechanism indicated generally by the numeral 77. The cam mechanism 77 includes a shaft 78 connected at one end to ratchet 80 and at the other end to ratchet 82. Cams 83 through 87 are mounted on the shaft 78. Each cam 83 through 87 has a set of individually movable gear tooth segments 88 through 92 as shown more clearly in FIGS. 2 and 3.

Shaft 78 is rotated in the direction indicated by the arrow in FIG. 4 upon downward movement of rack 94.

Rack 94 is in contact with pinion gear 96 connected to shaft 98.

A more detailed description of the counter mechanism and cam mechanism is shown in FIGS. 2, 3, and 4. As shown in these figures, the cams 83 through 87 are longitudinally spaced on the shaft 78. These cams are also mounted on the shaft 78 so that the sets of segments 88 through 92 are arcuately spaced from one another on the shaft 78. Thus, looking at FIG. 2, when the shaft 78 is rotated counterclockwise the gear teeth in sets 88 through 92 which have been extended will sequentially rotate drums 67 through 71, respectively.

Each cam 83 through 87 is provided with a recess 100 which extends inwardly toward the shaft 78 from the outside cam surface, such as cam surface 102 of cam 83. As shown in FIG. 2, the plurality of gear teeth segments 88 is mounted for slidable movement within the groove or recess 100 of cam 83. The slots 104 in the teeth 88 permit the teeth to be individually moved within the recess 100 along the lock screws 106. The other cams 84 through 87 are provided with a structure similar to the structure of cam 83.

As shown more clearly in FIGS. 3 and 4, a shaft 108 is mounted within the supports 110. Lever arms 111 through 114 are mounted for pivotal motion about the shaft 108. Idler gears 116 and rollers 121 are mounted on the pivotal arms 111 through 114. The idler gears 116 are biased into contact with gears 72 through 75 by means of the springs 126.

As the shaft 78 is rotated counterclockwise (looking at FIGS. 3 and 4), the forward edge 128 of cam 83 contacts roller 121; and the roller 121 rides along the edge 128 and then along cam surface 102 of cam 83. Thus, the idler gear 116 of arm 111 is moved out of contact with the gear 72 on drum 67 as shown by the broken lines of FIG. 4. Thereafter, those teeth 88 which have been extended to a position to extend beyond the cam surface 102 contact the gear 72 and rotate the drum 67 the desired number of units. As the roller 121 slides off the back end of cam surface 102, the idler gear 116 of arm 111 is again biased into contact with gear 72 by the biasing spring 126. The idler gears 116 of arms 112 through 114 are thereafter sequentially moved away from the gears 72 through 75 and the drums 68 through 71 preset in a similar manner.

FIGS. 5 and 5A show in more detail the mechanical interconnection between the counter drum mechanism 64 and the recocking operator 48. As shown in FIG. 5 (which only illustrates three counter drums for reasons of clarity), a trip or trigger 200 having one finger 201 for each counter drum is mounted on shaft 202 and is held by spring 204 in such a manner as to press the fingers against their respective counter drums. Also, a zero release latch 206 which is so designed as to hold or release a connector link 208 is mounted on the same shaft with the trip. A notch 207 in each counter drum is so located as to be opposite its finger on the trip when the drum is at zero reading. When all drums are at zero, the spring 204 will cause the fingers to move into their respective notches, causing the shaft 202 to rotate and causing the zero release latch 206 to release the connector link 208. The connector link 208 is pivoted on a pin 210 and connected to the spring biased valve 46 which controls flow of gas through line 60. When the connector link 208 is released by the zero release latch 206, the valve 46 is allowed to open. The slip joint 212 on the stem of the recocking operator 42 is positioned so as to allow the connector link 208 to move when zero is reached. However, when the recocking operator 42 is to function at, say 7 a.m., it moves against the shoulder of the slip joint and causes the connector link 208 to rotate back to the cocked position. Then, in its proper sequence, the function of registering the new day's count on the drums is effected, the trip is rotated outward from the drums, and the zero release latch latches the connector link until the next zero count is reached. A spring loaded pawl 214 on the zero release latch 206 will permit the connector link 208 to be moved back to the cocked position with the latch in the latched position should such need arise.

In operation, the proper number of teeth in each cam is moved outwardly from the cam center to preset in the drum mechanism the allowable oil production for a day. For instance, if the first drum on the counter were to register five, then five tooth segments would be needed on the first cam and so on. When the time cycle controller 22 registers, say 7 a.m., the gas line 26 will be opened. This directs gas under pressure to the system. The diaphragm valve 14 is closed at, say 15 p.s.i. The clutch connecting the meter 18 and the counter drum 64 is opened at, say 16 to 18 p.s.i.. Also, at 16 to 18 p.s.i. the recocking diaphragm 42 would be operated to recock the valve 46 in line 60. The reset actuator 50 is actuated at, say 22 to 25 p.s.i., to drive the cams on the cam mechanism 77 one turn around. As the cams are turned, their extended teeth reset the counter drums in sequence, adding to each drum the number of counts required. This would be in addition to any count already on the counter from the previous day.

After a predetermined time period, say at 7:05 a.m., the time cycle controller 22 closes the pressure to line 26 and bleeds off the pressure from the reset actuator 50, the clutch operator 36, and the recocking operator 42. This moves the rack 94 upwardly in preparation for the next preset operation and engages clutch 40 so that the shaft 66 on drum mechanism 64 can be rotated by the drive shaft 20 from the meter 18. Almost immediately, say at 7:06 a.m., the time cycle controller 22 allows gas to pass through the line 54 causing the bleed valve 58 to open and the valve 14 to open in turn. This allows the fluid flow through the meter 18 and the conduit 10 to resume.

As flow continues through the conduit 10, the quantity of fluid flowed through conduit 10 is registered on flowmeter 18. At the same time, the shaft 20 from flowmeter 18 rotates the drums in the drum mechanism 64 backwardly toward zero. If the quantity preset in drum mechanism 64 flows through the line 10 before 7 a.m. on the next succeeding day, the mechanism 48 is actuated to open the valve 46. Gas supply is fed through line 60, valve 46, and check valve 62 to the diaphragm 16 of diaphragm valve 14 to stop the flow of fluid. At 7 a.m. at the beginning of the next succeeding day, the cycle is repeated.

If, however 7 a.m. arrives on the next succeeding day before the preset amount of fluid has flowed through conduit 10, the valve 46 is not opened so that the flow of fluid through conduit 10 continues. At 7 a.m. on the next succeeding day, the cycle is repeated; and the preset quantity is added to the drum mechanism 64. The amount in this instance is added to the count already on the counter from the previous day so that the amount of fluid not flowed during the first day can be made up.

Though a pneumatic-type system is disclosed in FIG. 1, it is to be understood that the new counter mechanism can be adapted to an electrical-type system. This can be done, for example, by substituting an electrical time controller for the pneumatic time controller 22 and substituting solenoid valves for the diaphragm valves shown.

I claim:
1. In a system for limiting the quantity of fluid flowed through a conduit during a predetermined time period comprising: a flowmeter; a time controller; fluid flow control means; a counter mechanism having a shaft and a plurality of counter drums individually rotatable about said shaft, each drum having a gear; means for rotating said counter drums including a cam mechanism having a plurality of sets of individually movable teeth mounted thereon, one set of teeth for each counter drum whereby each counter drum can be preset a predetermined amount; means controlled by the time controller for actuating said cam mechanism to preset the counter mechanism at the beginning of the predetermined time period; means on the flowmeter responsive to fluid flow through the conduit for actuating the counter mechanism; and means actuated by the counter mechanism when the preset amount of fluid has flowed through the conduit to stop said fluid flow control means.

2. A system in accordance with claim 1 wherein said cam mechanism includes a plurality of cams, each having a set of individually movable teeth adapted to be moved to a position to engage a particular gear on a particular counter drum when the time controller actuates the cam mechanism to preset the counter mechanism.

References Cited in the file of this patent

UNITED STATES PATENTS

| | | |
|---|---|---|
| 843,506 | Trinks | Feb. 7, 1907 |
| 2,340,743 | Griffith | Feb. 1, 1944 |
| 2,593,894 | Klopfenstein | Apr. 22, 1952 |
| 2,626,104 | Pressler | Jan. 20, 1953 |
| 2,953,281 | Johnson | Sept. 20, 1960 |